(12) United States Patent
Jeong et al.

(10) Patent No.: US 10,938,464 B1
(45) Date of Patent: Mar. 2, 2021

(54) INTELLIGENT BEAMFORMING METHOD, APPARATUS AND INTELLIGENT COMPUTING DEVICE

(71) Applicant: LG Electronics Inc., Seoul (KR)

(72) Inventors: Seongjae Jeong, Seoul (KR); Bojun Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/578,998

(22) Filed: Sep. 23, 2019

(30) Foreign Application Priority Data

Aug. 31, 2019 (KR) .................. 10-2019-0107826

(51) Int. Cl.
*H04L 1/02* (2006.01)
*H04B 7/06* (2006.01)
*H04W 84/04* (2009.01)

(52) U.S. Cl.
CPC ........... *H04B 7/0617* (2013.01); *H04B 7/063* (2013.01); *H04W 84/042* (2013.01)

(58) Field of Classification Search
CPC ....... H04L 1/0618; H04L 1/06; H04B 7/0417; H04B 17/318; H04B 7/0617; H04B 7/0413; H04W 16/28; H04W 24/10
USPC ................................. 375/267, 260
See application file for complete search history.

(56) References Cited

U.S. PATENT DOCUMENTS

| | | | |
|---|---|---|---|
| 2016/0261325 A1* | 9/2016 | Ko .................. | H04B 7/0695 |
| 2017/0117948 A1* | 4/2017 | Takano ............ | H04B 7/10 |
| 2018/0152852 A1* | 5/2018 | Chang ............. | H04B 17/318 |
| 2018/0262918 A1* | 9/2018 | Zhao ............... | H04B 7/0482 |

* cited by examiner

Primary Examiner — Khai Tran
(74) Attorney, Agent, or Firm — Fish & Richardson P.C.

(57) ABSTRACT

An intelligent beamforming method and apparatus are disclosed. The intelligent beamforming apparatus may acquire information about a beamforming environment around a plurality of antennas, feed beamforming configuration information into a pre-trained beamforming configuration model, acquire optimal beamforming configuration information for the plurality of antennas as outputs from the beamforming configuration model, and configure beamforming for the plurality of antennas based on the optimal beamforming configuration information. Therefore, when there is a deviation in direction from the linearity of beams in an actual-use environment, it is possible to identify information about the surrounding environment and provide beamforming customized for the environment. One or more between an intelligent beamforming apparatus and method and an intelligent computing device according to the present disclosure may be associated with an artificial intelligence module, an unmanned aerial vehicle (UAV), an augmented reality (AR) device, a virtual reality (VR) device, a 5G service-related device, etc.

9 Claims, 13 Drawing Sheets

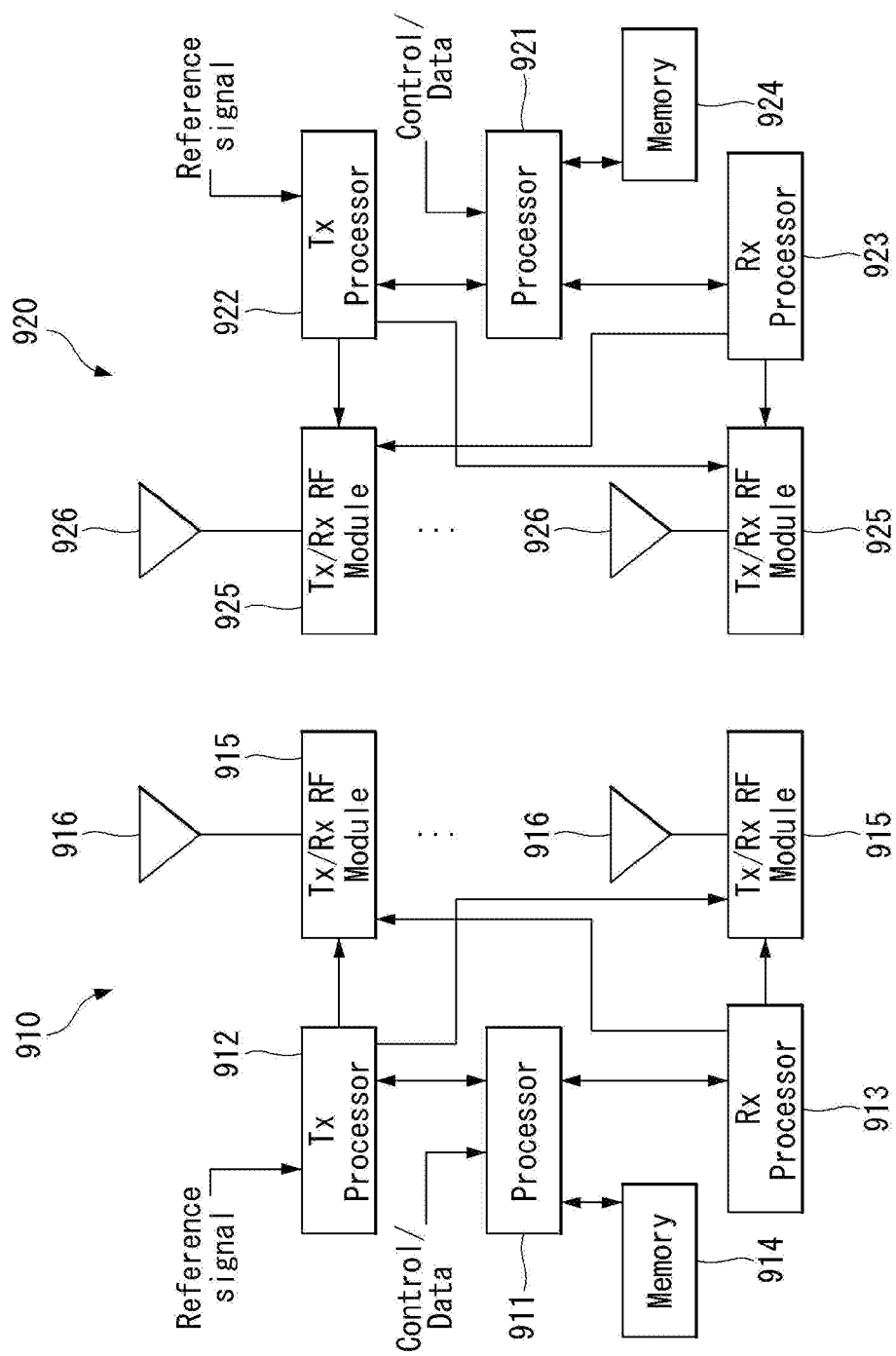
[FIG. 1]

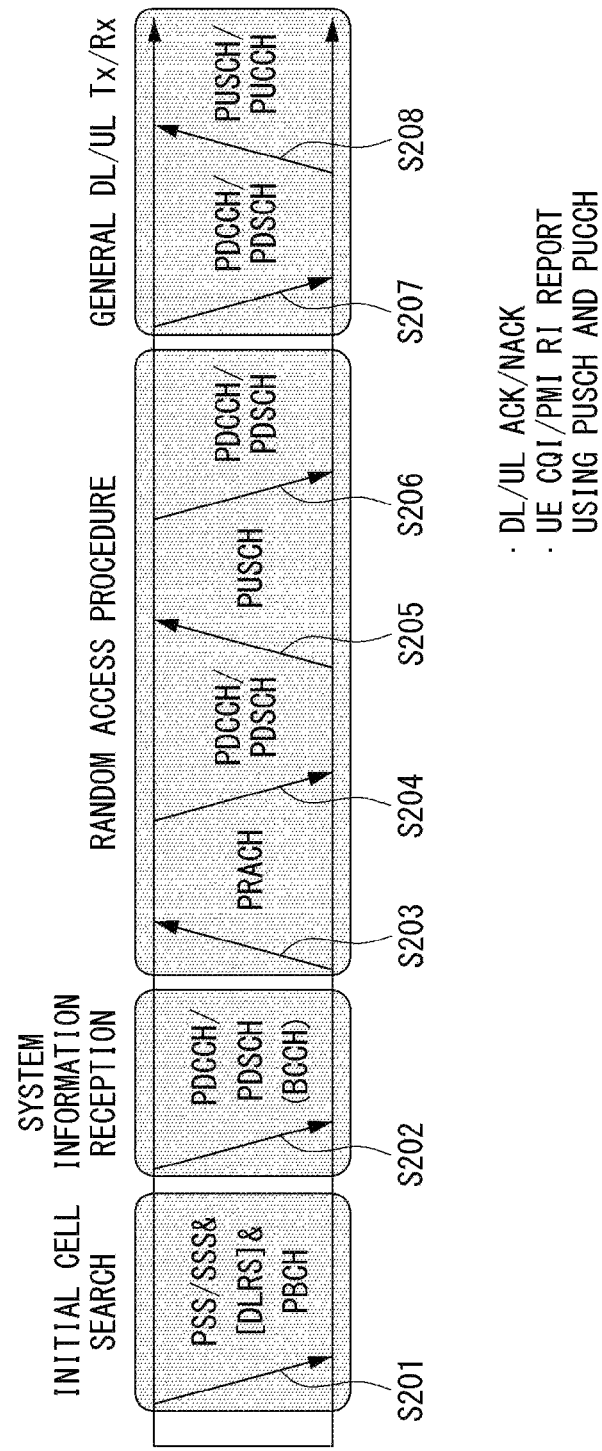

[FIG. 3]
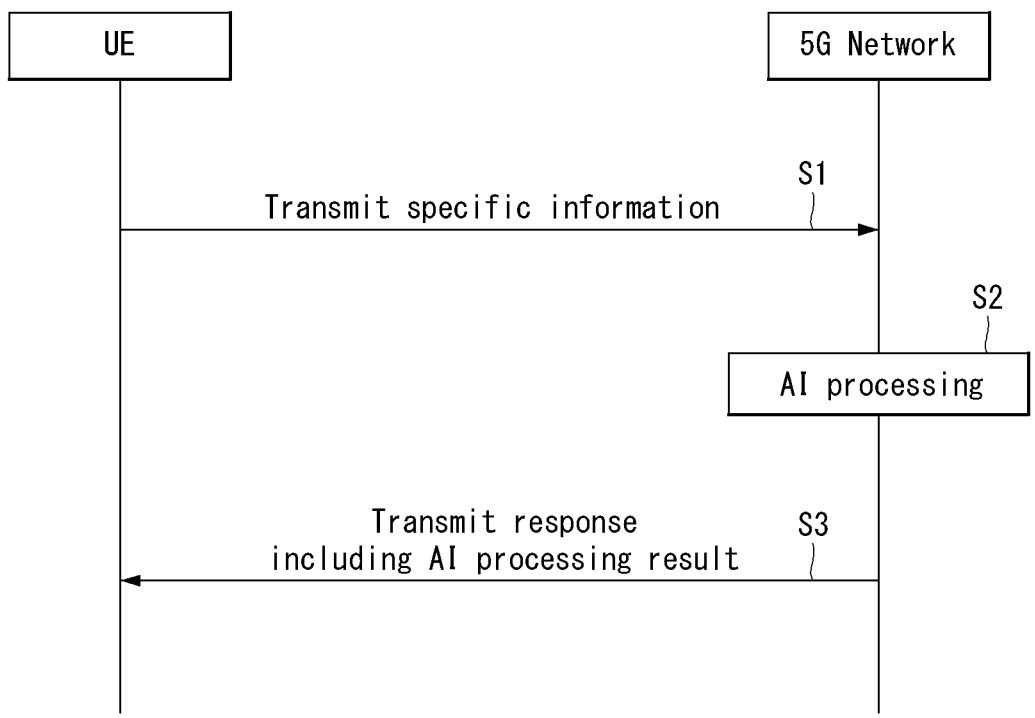

[FIG. 4]
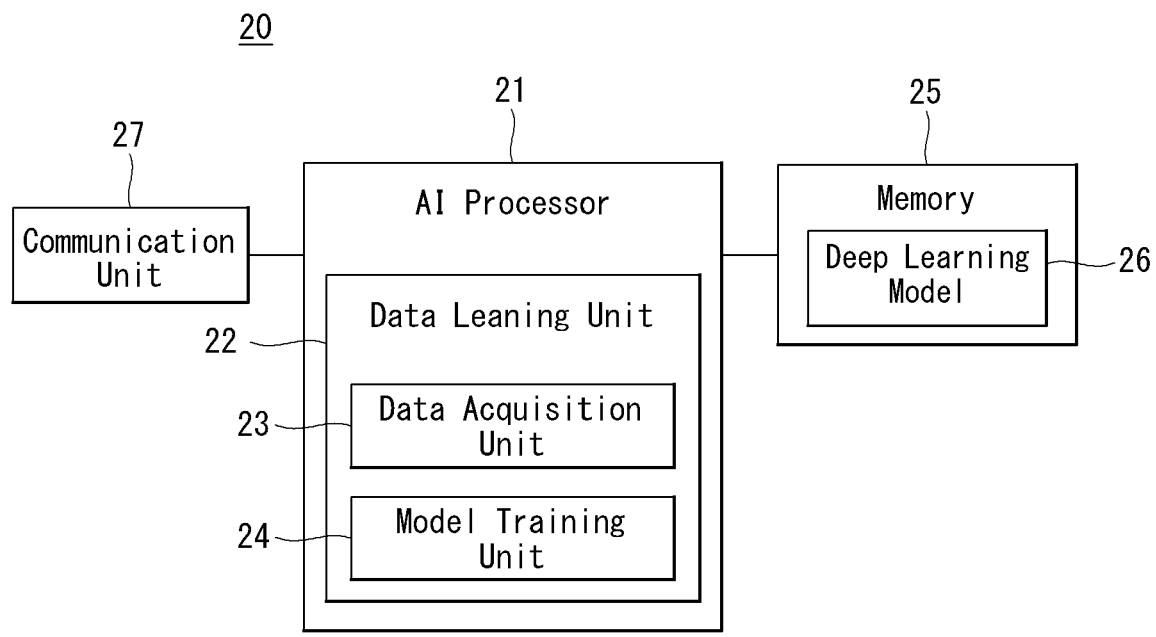

[FIG. 5]
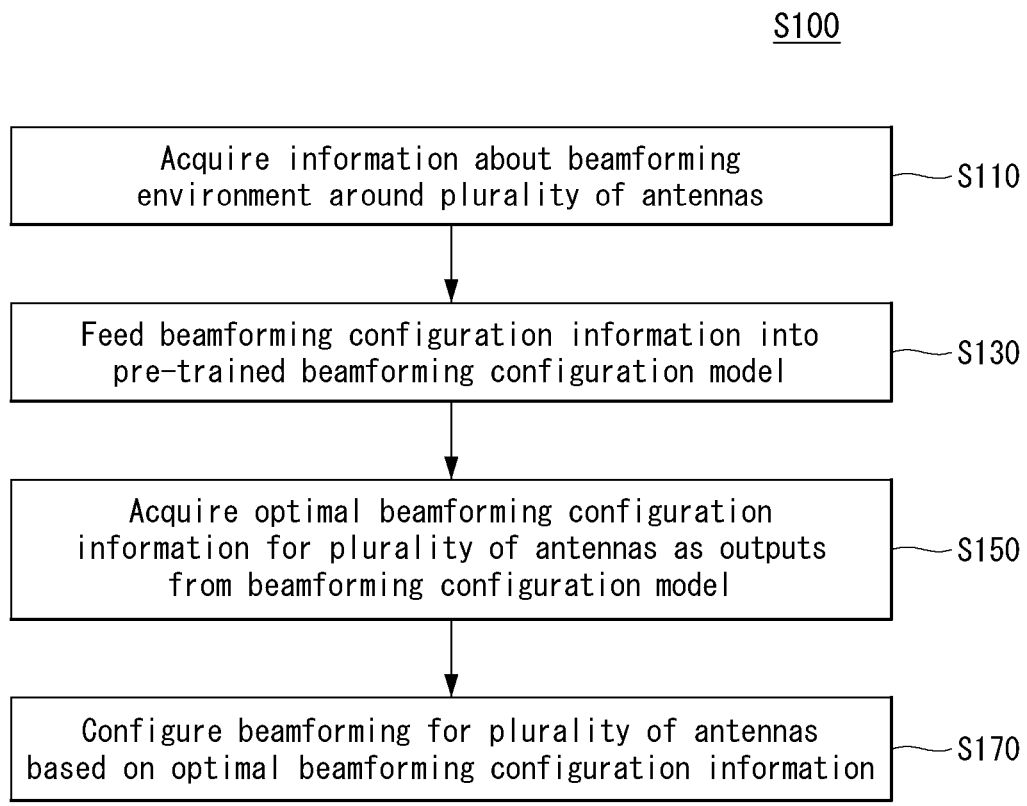

[FIG. 6]
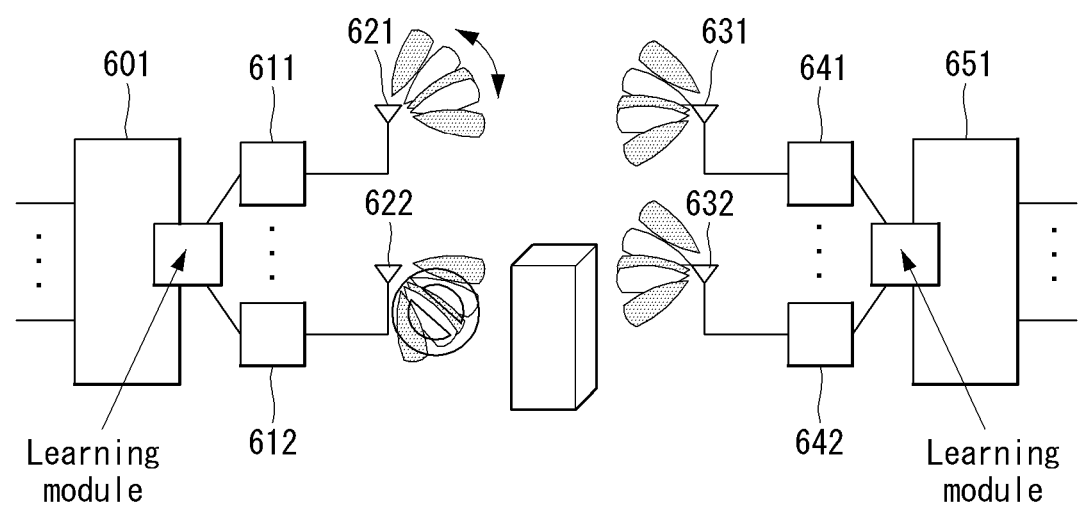

[FIG. 7]
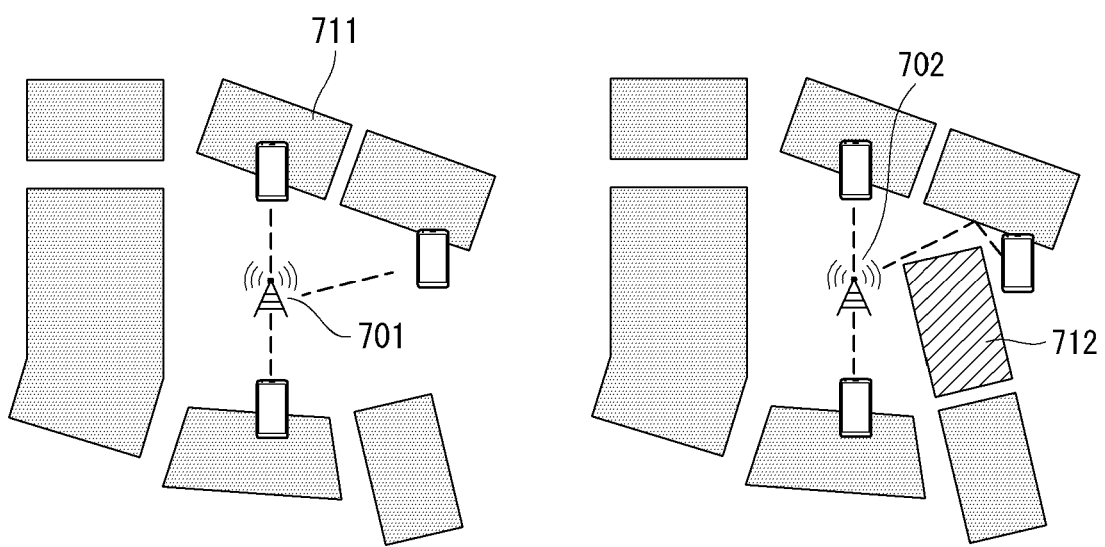

【FIG. 8】
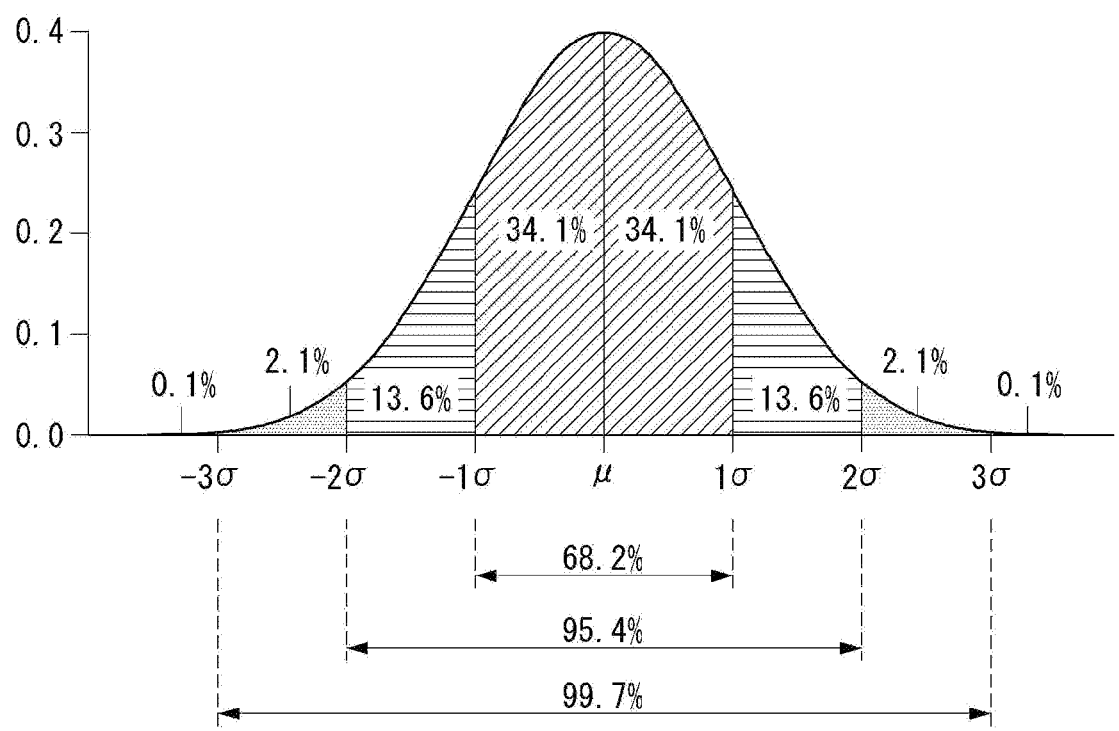

[FIG. 9]
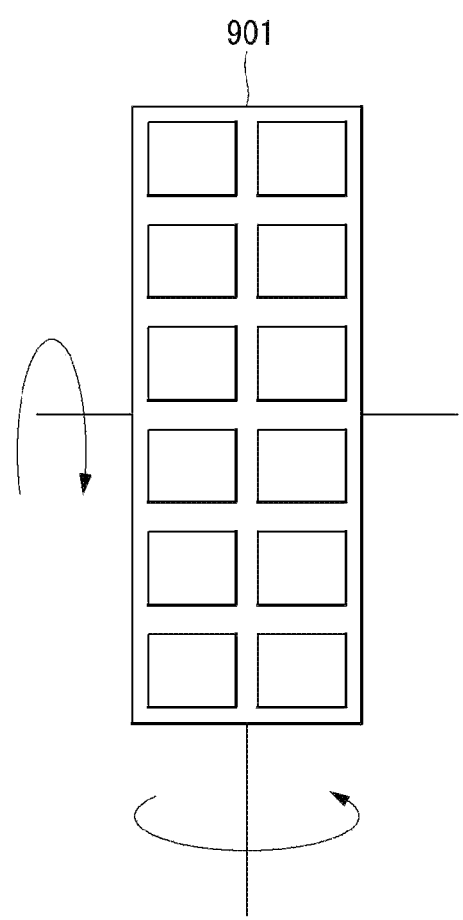

[FIG. 10]
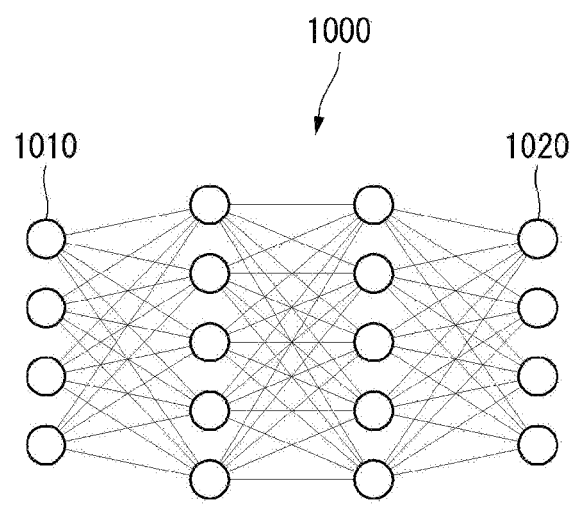

[FIG. 11]
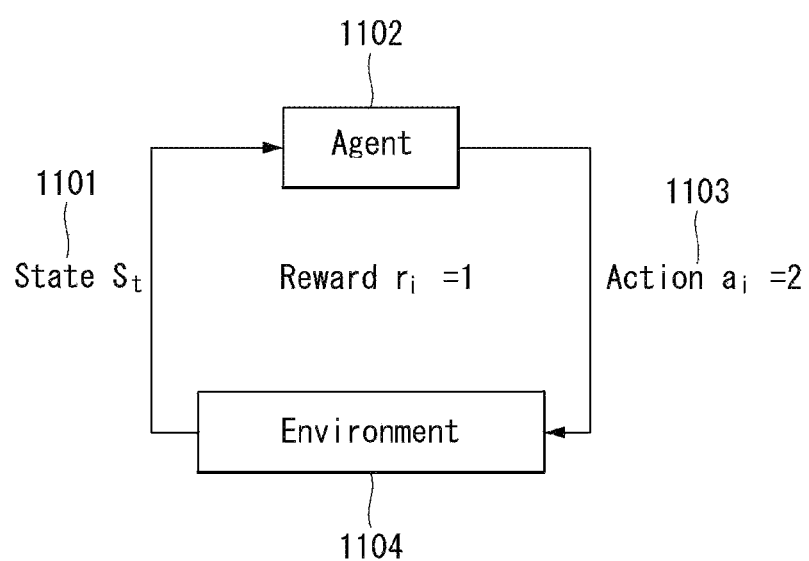

[FIG. 12]
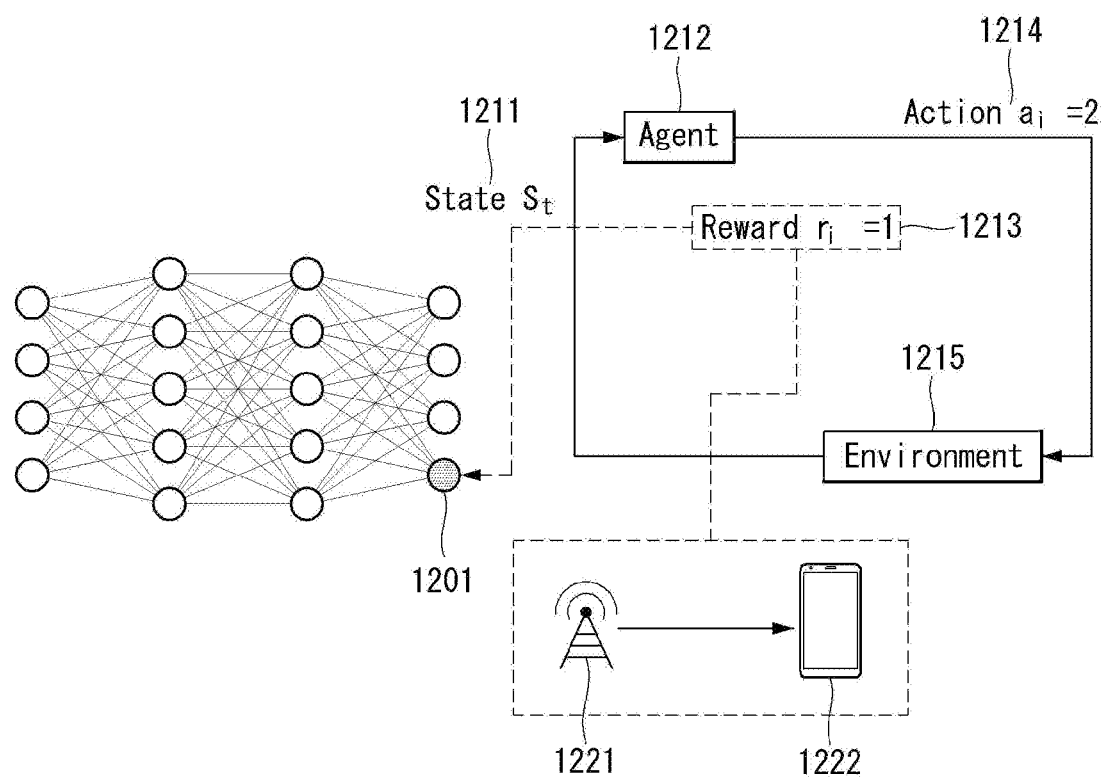

[FIG. 13]
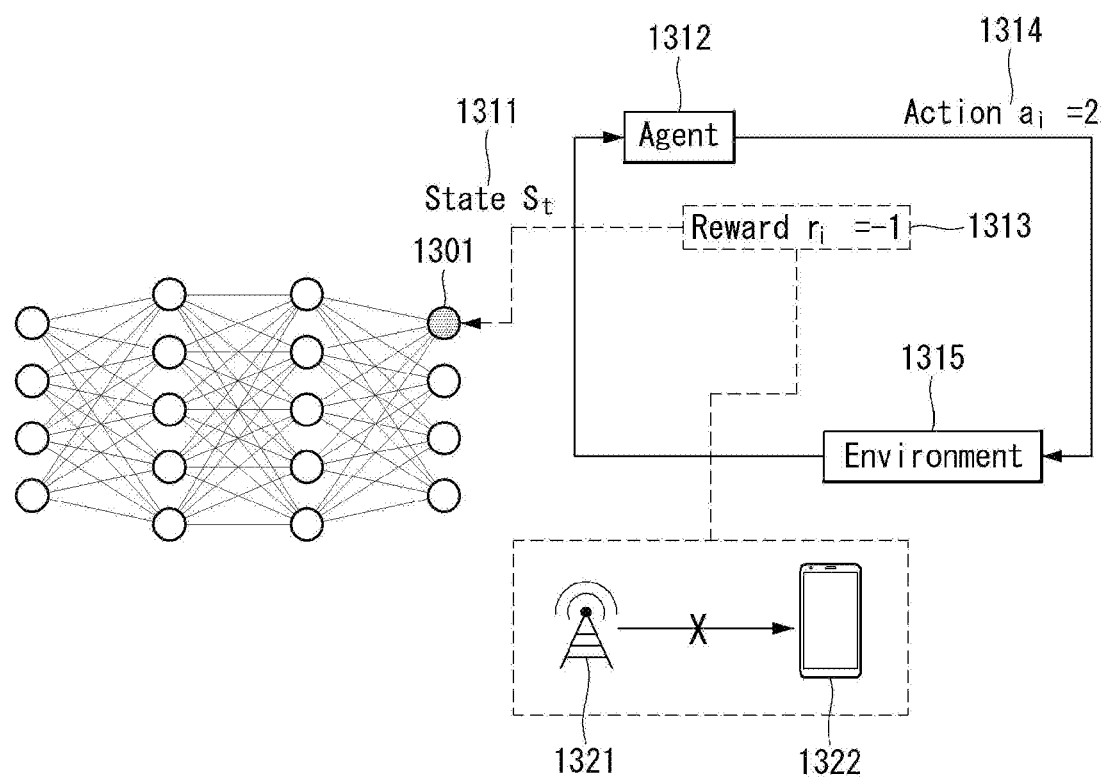

INTELLIGENT BEAMFORMING METHOD, APPARATUS AND INTELLIGENT COMPUTING DEVICE

CROSS-REFERENCE TO RELATED APPLICATION(S)

This application is based on and claims priority under 35 U.S.C. 119 to Korean Patent Application No. 10-2019-0107826, filed on Aug. 31, 2019, in the Korean Intellectual Property Office, the disclosure of which is herein incorporated by reference in its entirety.

BACKGROUND OF THE INVENTION

Field of the Invention

The present disclosure relates to an intelligent beamforming method and apparatus and an intelligent computing device and, more particularly, to an intelligent beamforming method and apparatus and an intelligent computing device that are optimized for actual-use environments.

Related Art

Current base stations (BS) for communications (e.g., 5G) are installed in fixed positions. For each installation, networking engineers need to make measurements, do checks, and then correct network locations.

Conventionally, reports and feedback to BS (base station) do not take account of ambient obstacles (such as newly constructed buildings, temporary buildings, roadside trees, etc.), so they have to be sent to SSB or repetitions have to be turned on or off. These configurations need to be corrected by operators themselves, which can be an inconvenience.

SUMMARY OF THE INVENTION

An aspect of the present disclosure is to solve the above-described needs and/or problems.

Another aspect of the present disclosure is to implement an intelligent beamforming method and apparatus and an intelligent computing device that are optimized for actual use environments.

An exemplary embodiment of the present disclosure provides an intelligent beamforming method comprising: acquiring information about a beamforming environment around a plurality of antennas; feeding beamforming configuration information into a pre-trained beamforming configuration model; acquiring optimal beamforming configuration information for the plurality of antennas as outputs from the beamforming configuration model; and configuring beamforming for the plurality of antennas based on the optimal beamforming configuration information.

The beamforming environment information may comprise information related to the arrangement of obstacles around the plurality of antennas.

The acquiring of the beamforming environment information may comprise: transmitting a reference signal to an external antenna from the plurality of antennas; receiving a response signal to the reference signal; and acquiring the beamforming environment information based on the response signal.

The beamforming environment information may comprise information related to the time taken to receive the response signal.

The optimal beamforming configuration information for the plurality of antennas may comprise angle setting information for the plurality of antennas.

Another exemplary embodiment of the present disclosure provides an intelligent beamforming apparatus comprising: a rotating module for adjusting the angles of the plurality of antennas; and a processor that acquires information about a beamforming environment around a plurality of antennas, feeds beamforming configuration information into a pre-trained beamforming configuration model, acquires optimal beamforming configuration information for the plurality of antennas as outputs from the beamforming configuration model, and configures beamforming for the plurality of antennas by the rotating model based on the optimal beamforming configuration information.

The beamforming environment information may comprise information related to the arrangement of obstacles around the plurality of antennas.

The processor may transmit a reference signal to an external antenna from the plurality of antennas, receive a response signal to the reference signal, and acquire the beamforming environment information based on the response signal.

The beamforming environment information may comprise information related to the time taken to receive the response signal.

The optimal beamforming configuration information for the plurality of antennas may comprise angle setting information for the plurality of antennas.

A further exemplary embodiment of the present disclosure provides a non-transitory, computer-readable recording medium storing a computer-executable component configured to be executed by one or more processors of a computing device, wherein the computer-executable component acquires information about a beamforming environment around a plurality of antennas, feeds beamforming configuration information into a pre-trained beamforming configuration model, acquires optimal beamforming configuration information for the plurality of antennas as outputs from the beamforming configuration model, and configures beamforming for the plurality of antennas by a rotating module based on the optimal beamforming configuration information.

An intelligent beamforming method and apparatus and an intelligent computing device according to an exemplary embodiment of the present disclosure have the following advantageous effects.

According to the present disclosure, beamforming antennas cannot be adjusted by an engineer, and, therefore, when there is a deviation in direction from the linearity of beams in an actual-use environment, it is possible to identify information about the surrounding environment and provide beamforming customized for the environment.

According to the present disclosure, it is possible to provide customized beamforming by taking account of changes in the actual-use environment after the initial design.

According to the present disclosure, it is possible to correct the beamforming location based on environment information while keeping beamforming configuration focused in one location.

According to the present disclosure, BS may recognize the surrounding environment before sending a signal.

It is to be understood that the advantages that can be obtained by the present disclosure are not limited to the aforementioned advantages and other advantages which are not mentioned will be apparent from the following description to the person with an ordinary skill in the art to which the present disclosure pertains.

BRIEF DESCRIPTION OF THE DRAWINGS

The accompanying drawings, included as part of the detailed description in order to provide a thorough understanding of the present disclosure, provide embodiments of the present disclosure and together with the description, describe the technical features of the present disclosure.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 is a block diagram of an AI device according to an exemplary embodiment of the present disclosure.

FIG. 5 is a flowchart showing an intelligent beamforming according to an exemplary embodiment of the present disclosure.

FIG. 6 shows a communication system according to an exemplary embodiment of the present disclosure.

FIG. 7 shows obstacles according to an exemplary embodiment of the present disclosure.

FIG. 8 shows a distribution of response time according an exemplary embodiment of the present disclosure.

FIG. 9 shows an angle adjustment method for a beamforming apparatus.

FIG. 10 shows a beamforming configuration model according to an exemplary embodiment of the present disclosure.

FIG. 11 shows an evolutionary learning structure according to an exemplary embodiment of the present disclosure.

FIG. 12 shows a reinforcement learning method according to an exemplary embodiment of the present disclosure.

FIG. 13 shows an example of reinforcement learning according to an exemplary embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationlnfo is set for SRS resources, the same beamforming as that used for the SSB, CSI-RS or SRS is applied. However, when SRS-SpatialRelationlnfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 4 is a block diagram of an AI device according to an exemplary embodiment of the present disclosure.

The AI device 20 may comprise an electronic device including an AI module for performing AI processing or a server including the AI module. Also, the AI device 20 may be included as at least some component of the first communication device 910 or the second communication device 920 shown in FIG. 3 so as to perform at least part of the AI processing together with the speech recognition apparatus 10.

The AI processing may comprise all operations related to the speech recognition of the first communication device 910 or the second communication device 920 shown in FIG. 3. For example, an autonomous vehicle may perform tasks such as processing, making decisions, and creating a control signal, by performing AI processing of sensing data or driver data. For example, the autonomous vehicle may perform autonomous driving control by performing AI processing on data acquired through interactions with other electronic devices provided in the vehicle.

The AI device 20 may comprise an AI processor 21, a memory 25, and/or a communication part 27.

The AI device 20 is a computing device capable of training a neural network, and may be implemented as various electronic devices such as a server, desktop PC, laptop PC, and tablet PC.

The AI processor 21 may train a neural network by using a program stored in the memory 25. Particularly, the AI processor 21 may train a neural network for recognizing device-related data. Here, the neural network for recognizing device-related data may be designed to emulate a human brain's structure on a computer, and may comprise a plurality of network nodes having weights that emulate neurons in a human neural network. The plurality of network nodes may send and receive data through connections so that they emulate the synaptic activity of neurons sending and receiving signals through synapses. Such a neural network may comprise a deep learning model, which evolved from a neural network model. In the deep learning model, the plurality of network nodes are arranged in different layers, and may send and receive data through convolutions. Examples of the neural network model include various deep learning techniques such as deep neural networks (DNN), convolutional deep neural networks (CNN), recurrent neural networks (RNN), restricted Boltzmann machines (RBM), deep belief networks (DBN), and deep Q-networks, and are applicable to fields including computer vision, speech recognition, natural language processing, and speech/signal processing.

Meanwhile, a processor that performs the above-described functions may be a general-purpose processor (e.g., CPU) or an AI-dedicated processor (e.g., GPU) for artificial intelligence learning.

The memory 25 may store various programs and data required for the operation of the AI device 20. The memory 25 may be implemented as non-volatile memory, volatile memory, flash memory, hard disk drive (HDD), or solid state drive (SSD). The memory 25 is accessed by the AI processor 21, and the AI processor 21 may read, write, modify, delete, or update data. Also, the memory 25 may store a neural network model (e.g., deep learning model 26) created by a learning algorithm for data classification/recognition according to an exemplary embodiment of the present disclosure.

Meanwhile, the AI processor 21 may further comprise a data learning unit 22 for training a neural network for data classification/recognition. The data learning unit 22 may learn criteria about which learning data it will use to determine on data classification/recognition and how data is classified and recognized using learning data. The data learning unit 22 may train a deep learning model by acquiring learning data to be used in learning and applying the acquired learning data to the deep learning model.

The data learning unit 22 may be manufactured in the form of at least one hardware chip and mounted on the AI device 20. For example, the data learning unit 22 may be manufactured in the form of a hardware chip dedicated to artificial intelligence (AI), or may be manufactured as part of a general-purpose processor (CPU) or dedicated graphics processor (GPU) and mounted on the AI device 20. Also, the data learning unit 22 may be implemented as a software module. If it is implemented as a software module (or a program module including instructions), the software module may be stored in a non-transitory computer readable medium. In this case, at least one software module may be provided by an OS (operating system) or by an application.

The data learning unit 22 may comprise a learning data acquisition unit 23 and a model learning unit 24.

The learning data acquisition unit 23 may acquire learning data required for a neural network model for classifying and recognizing data. For example, the learning data acquisition unit 23 may acquire learning data such as data to be fed into the neural network model and/or feature values extracted from data.

By using the acquired learning data, the model learning unit 24 may train the neural network model to have criteria for determining how to classify certain data. In this instance, the model learning unit 24 may train the neural network model through supervised learning which uses at least part of the learning data as the criteria for determination. Alternatively, the model learning unit 24 may train the neural network model through unsupervised learning which helps find criteria for determination by allowing the neural network model to learn on its own without supervision using the learning data. Also, the model learning unit 24 may train the neural network model through reinforcement learning by using feedback about whether a right decision is made on a situation by learning. Also, the model learning unit 24 may train the neural network model by using a learning algorithm including error back-propagation or gradient descent.

Once the neural network model is trained, the model learning unit 24 may store the trained neural network model in memory. The model learning unit 24 may store the trained neural network model in a memory of a server connected to the AI device 20 over a wired or wireless network.

The data learning unit 22 may further comprise a learning data pre-processing part (not shown) and a learning data selection part (not shown), in order to improve analysis results from a recognition model or save the resources or time needed to create the recognition model.

The learning data pre-processing part may pre-process acquired data so that the acquired data is used in learning to decide on situations. For example, the learning data pre-processing part may process acquired learning data into a preset format to enable the model learning unit 24 to use the acquired data in learning to recognize images.

Moreover, the learning data selection part may select data required for learning from among the learning data acquired by the learning data acquisition unit 23 or the learning data pre-processed by the pre-processing part. The selected learning data may be provided to the model learning unit 24. For example, the learning data selection part may detect a specific segment from an image acquired by a camera in the vehicle so as to select only data about objects included in the specific segment as learning data.

In addition, the data learning unit 22 may further comprise a model evaluation part (not shown) for improving analysis results from the neural network model.

The model evaluation part may feed evaluation data into the neural network model, and, if analysis results produced from the evaluation data do not satisfy a predetermined criterion, may get the model learning unit 24 to train the neural network model again. In this case, the evaluation data may be data that is defined for evaluating the recognition model. In an example, if the number or proportion of evaluation data from which inaccurate analysis results are produced by analyzing the recognition model trained on the evaluation data exceeds a preset threshold, the model evaluation part may evaluate the analysis results as not satisfying the predetermined criterion.

The communication part 27 may transmit AI processing results from the AI processor 21 to an external electronic device.

Here, the external electronic device may be defined as an autonomous vehicle. Also, the AI device 20 may be defined as another vehicle or 5G network that communicates with the autonomous vehicle. Meanwhile, the AI device 20 may be functionally embedded in a self-driving module provided in the vehicle. Also, the 5G network may comprise a server or module that performs autonomous driving-related control.

Although the AI device 20 shown in FIG. 4 has been described as being functionally divided into the AI processor 21, memory 25, communication part 27, etc., it should be noted that the above-described components may be integrated into one module and called an AI module.

FIG. 5 is a flowchart showing an intelligent beamforming method for a beamforming apparatus according to an exemplary embodiment of the present disclosure.

As shown in FIG. 5, according to the exemplary embodiment of the present disclosure, the beamforming apparatus may acquire information about a beamforming environment around a plurality of antennas (S110).

For example, the beamforming apparatus may be the AI device 20 described with reference to FIG. 4.

Subsequently, the beamforming apparatus may feed beamforming configuration information into a pre-trained beamforming configuration model (S130).

Here, the beamforming configuration model may be pre-trained and at the same time trained based on the current beamforming configuration information and the time taken to receive a response signal to be explained later.

Next, the beamforming apparatus may acquire optimal beamforming configuration information for the plurality of antennas as outputs from the beamforming configuration model (S150).

Subsequently, the beamforming apparatus may configure beamforming for the plurality of antennas based on the optimal beamforming configuration information (S170).

For example, the beamforming apparatus may set the angle of a plurality of antennas based on the optimal beamforming configuration information including angle setting information for the plurality of antennas.

FIG. 6 shows a communication system according to an exemplary embodiment of the present disclosure.

As shown in FIG. 6, a first communication device 601 may be connected to a learning module, the learning module may be connected to a plurality of beamformers 611 and 612, and the beamformers may be connected to a plurality of antennas 621 and 622.

Each antenna may be set up based on preset beamforming configuration information.

A second communication device 602 may be connected to a plurality of beamformers 641 and 642, and the beamformers may be connected to a plurality of antennas 631 and 632.

Each antenna may be set up based on preset beamforming configuration information.

Here, each beamformer may process signals in such a way that the signals are not transmitted if there is an obstacle in front of the antenna.

Moreover, if there is no response signal to an ACK sent to the second beamformer, the first beamformer learns that there is an obstacle in the path of transmission and sends no signal.

After a certain amount of time, the first beamformer may send an ACK again to the second beamformer to see if the obstacle was only temporary and has now disappeared, and may transmit a signal again if it receives a response signal as the obstacle has disappeared.

The first beamformer may measure the initial period of time between the transmission of an ACK and the reception of a response signal and measure the travel time of a response signal from every direction.

Here, the first beamformer may decrease the amount of beams at a location where the time of arrival is below a threshold and adjust the beamforming location by 1 degree to the left, right, up, and down, and may increase the amount of beams at the location if the response time falls below a threshold after the adjustment.

FIG. 7 shows obstacles according to an exemplary embodiment of the present disclosure.

As shown in FIG. 7, the number of obstacles 711 around a beamformer 701 is lower than the number of obstacles 712 around a beamformer 702.

For example, the beamformers may find the positional relation between such obstacles.

FIG. 8 shows a distribution of response time according an exemplary embodiment of the present disclosure.

As shown in FIG. 8, according to the exemplary embodiment of the present disclosure, a beamformer may measure the response time to an ACK signal.

The beamformer may set the cumulative time spent collecting data to learn a beamforming configuration model.

The beamformer may measure the average time taken to receive a response signal to a transmitted ACK, corresponding to the learning time. In this case, the average time may be normally distributed with standard deviations.

The beamformer may move the beamforming direction 5 degrees to the left and right if the detection rate in a normal distribution area is not within the range of 95.4%, so as to measure the average ACK response time and then correct the beamforming location based on learning results depending on the response time.

FIG. 9 shows an angle adjustment method for a beamforming apparatus.

As shown in FIG. 9, according to an exemplary embodiment of the present disclosure, a beamformer may adjust the angle of each antenna 901 by using a rotating module.

For example, if the time taken to receive a response signal to a transmitted ACK signal is equal to or above a threshold, the beamformer may determine that there is an obstacle, decrease the amount of beams for each antenna, and change the angle of each antenna by 1 degree to the left, right, up, and down.

After changing the angle, the beamformer may repeat the above same operation.

FIG. 10 shows a beamforming configuration model according to an exemplary embodiment of the present disclosure.

As shown in FIG. 10, the beamforming configuration model 1000 may take image pixel information about the outside as its inputs 1010. Here, image pixels may be composed of pixels with obstacles and pixels with no obstacles.

Here, the beamformer may adjust the angle of antennas, measure the phase difference between response signals received by the antennas, and acquire optimal beamforming configuration information as its outputs 1020.

FIG. 11 shows an evolutionary learning structure according to an exemplary embodiment of the present disclosure.

As shown in FIG. 11, according to the exemplary embodiment of the present disclosure, STATE St 1101 for learning a beamforming configuration model may refer to information about a surrounding environment (network environment information) where BS takes actions.

Here, Agent 1102's action Action Ai of sending a signal may be equal to 2. Also, the beamformer may provide a reward ri of 1 for pixels whose signals can be sent to each area.

The beamformer may recognize rewards as feedback and update the beamforming configuration state of its BS (base station). Here, the beamformer may adjust the beamforming configuration state (angle) of antennas based on an instruction from the agent.

The beamformer may obtain an optimal output through the above-described process.

FIG. 12 shows a reinforcement learning method according to an exemplary embodiment of the present disclosure.

As shown in FIG. 12, Agent 1212 may serve as a base station BS that transmits signals. That is, the base station may be the first communication device described with reference to FIG. 6.

STATE St 1211 may refer to information about a surrounding environment (network environment information) where BS takes actions.

Here, Environment 1215 may serve as a surrounding environment (e.g., obstacles) where BS takes actions, i.e., sends signals.

Here, Action 1214 may refer to an action BS takes to predict which signal to send upon seeing State.

Here, a reward may be given from the environment if BS performs a good action to send signals properly.

The beamformer may allow the agent to update the state of its BS based on the reward as feedback.

In the above, the larger the amplitude of a response signal received from a second communication device, the higher reward the beamformer provides.

FIG. 13 shows an example of reinforcement learning according to an exemplary embodiment of the present disclosure.

As shown in FIG. 13, a beamforming configuration model may produce a pixel 1301 as an output, whose signal cannot be sent by BS. That is, if UE 1322 sends no response signal to the base station 1321 (beamformer) or a response signal is transmitted at a time when the response time is equal to or above a threshold, the beamforming configuration model may produce the pixel 1301 as an output, whose signal cannot be sent by BS.

Here, the beamformer 1321 may provide a negative reward (Reward n=−1) to the agent.

The beamformer may recognize the reward as feedback and allow the agent to update the state of the agent's BS.

Embodiment 1: An intelligent beamforming method comprising: acquiring information about a beamforming environment around a plurality of antennas; feeding beamforming configuration information into a pre-trained beamforming configuration model; acquiring optimal beamforming configuration information for the plurality of antennas as outputs from the beamforming configuration model; and configuring beamforming for the plurality of antennas based on the optimal beamforming configuration information.

Embodiment 2: In Embodiment 1, the beamforming environment information comprises information related to the arrangement of obstacles around the plurality of antennas.

Embodiment 3: In Embodiment 2, the acquiring of the beamforming environment information comprises: transmitting a reference signal to an external antenna from the plurality of antennas; receiving a response signal to the reference signal; and acquiring the beamforming environment information based on the response signal.

Embodiment 4: In Embodiment 3, the beamforming environment information comprises information related to the time taken to receive the response signal.

Embodiment 5: In Embodiment 1, the optimal beamforming configuration information for the plurality of antennas comprises angle setting information for the plurality of antennas.

Embodiment 6: An intelligent beamforming apparatus comprising: a rotating module for adjusting the angles of the plurality of antennas; and a processor that acquires information about a beamforming environment around a plurality of antennas, feeds beamforming configuration information into a pre-trained beamforming configuration model, acquires optimal beamforming configuration information for the plurality of antennas as outputs from the beamforming configuration model, and configures beamforming for the plurality of antennas by the rotating model based on the optimal beamforming configuration information.

Embodiment 7: In Embodiment 6, the beamforming environment information comprises information related to the arrangement of obstacles around the plurality of antennas.

Embodiment 8: In Embodiment 7, the processor transmits a reference signal to an external antenna from the plurality of antennas, receives a response signal to the reference signal, and acquires the beamforming environment information based on the response signal.

Embodiment 9: In Embodiment 8, the beamforming environment information comprises information related to the time taken to receive the response signal.

Embodiment 10: In Embodiment 9, the optimal beamforming configuration information for the plurality of antennas comprises angle setting information for the plurality of antennas.

Embodiment 11: A non-transitory, computer-readable recording medium storing a computer-executable component configured to be executed by one or more processors of a computing device, wherein the computer-executable component acquires information about a beamforming environment around a plurality of antennas, feeds beamforming configuration information into a pre-trained beamforming configuration model, acquires optimal beamforming configuration information for the plurality of antennas as outputs from the beamforming configuration model, and configures beamforming for the plurality of antennas by a rotating module based on the optimal beamforming configuration information.

The present disclosure described above may be implemented in computer-readable codes in a computer readable recording medium, and the computer readable recording medium may include all kinds of recording devices for storing data that is readable by a computer system. Examples of the computer readable recording medium include HDD (Hard Disk Drive), SSD (Solid State Disk), SDD (Silicon Disk Drive), ROM, RAM, CD-ROM, magnetic tape, floppy disk, optical data storage device, and the like, and may be implemented in the form of carrier waves (e.g., transmission through the internet). Accordingly, the foregoing detailed description should not be interpreted as restrictive in all aspects, and should be considered as illustrative. The scope of the present disclosure should be determined by rational interpretation of the appended claims, and all changes within the equivalent scope of the present disclosure are included in the scope of the present disclosure.

What is claimed is:

1. An method of performing intelligent beamforming in a wireless communication system, the method comprising:
obtaining beamforming environment information related to an arrangement of obstacles around a plurality of antennas;
feeding the beamforming environment information into a pre-trained beamforming configuration model;
obtaining optimal beamforming configuration information for the plurality of antennas as outputs from the beamforming configuration model; and
configuring beamforming for the plurality of antennas based on the optimal beamforming configuration information.

2. The method of claim 1, wherein the obtaining of the beamforming environment information comprises:
transmitting a reference signal to an external antenna from the plurality of antennas;

receiving a response signal in response to the reference signal; and obtaining the beamforming environment information based on the response signal.

3. The method of claim 2, wherein the beamforming environment information comprises information related to time taken to receive the response signal.

4. The method of claim 1, wherein the optimal beamforming configuration information for the plurality of antennas comprises angle setting information for the plurality of antennas.

5. An apparatus configured to perform intelligent beamforming in a wireless communication system, the apparatus comprising:

a processor configured to:
- obtain beamforming environment information related to an arrangement of obstacles around a plurality of antennas,
- feed the beamforming environment information into a pre-trained beamforming configuration model,
- obtain optimal beamforming configuration information for the plurality of antennas as outputs from the beamforming configuration model, and
- configure beamforming for the plurality of antennas based on the optimal beamforming configuration information.

6. The apparatus of claim 5, wherein the processor is further configured to (i) transmit a reference signal to an external antenna from the plurality of antennas, (ii) receive a response signal to the reference signal, and (iii) obtain the beamforming environment information based on the response signal.

7. The apparatus of claim 6, wherein the beamforming environment information comprises information related to time taken to receive the response signal.

8. The apparatus of claim 5, wherein the optimal beamforming configuration information for the plurality of antennas comprises angle setting information for the plurality of antennas.

9. A non-transitory, computer-readable recording medium storing computer-executable instructions that, based on being executed by one or more processors, control an apparatus to perform operations comprising, obtaining beamforming environment information related to an arrangement of obstacles around a plurality of antennas;

feeding the beamforming environment information into a pre-trained beamforming configuration model;

obtaining optimal beamforming configuration information for the plurality of antennas as outputs from the beamforming configuration model; and configuring beamforming for the plurality of antennas based on the optimal beamforming configuration information.

* * * * *